United States Patent
Han et al.

(10) Patent No.: US 9,924,299 B2
(45) Date of Patent: Mar. 20, 2018

(54) METHOD AND APPARATUS FOR CONTROLLING OPERATIONS OF ELECTRONIC DEVICE

(71) Applicant: Samsung Electronics Co., Ltd., Gyeonggi-do (KR)

(72) Inventors: Young-Eun Han, Gyeonggi-do (KR); Kwang-Sub Son, Gyeonggi-do (KR); Sung-Ho Son, Daegu (KR); Won-Suk Choi, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 14/626,720

(22) Filed: Feb. 19, 2015

(65) Prior Publication Data

US 2015/0237462 A1 Aug. 20, 2015

(30) Foreign Application Priority Data

Feb. 20, 2014 (KR) .................. 10-2014-0019610

(51) Int. Cl.

| H04M 11/04 | (2006.01) |
|---|---|
| H04W 4/00 | (2018.01) |
| H04W 4/22 | (2009.01) |
| H04B 7/15 | (2006.01) |

(52) U.S. Cl.
CPC .............. *H04W 4/008* (2013.01); *H04B 7/15* (2013.01); *H04W 4/22* (2013.01)

(58) Field of Classification Search
CPC .................................................. H04W 4/008

USPC ...................................................... 455/404.1
See application file for complete search history.

(56) References Cited

U.S. PATENT DOCUMENTS

| 2008/0064422 A1 | 3/2008 | Scholl |
|---|---|---|
| 2010/0279647 A1 | 11/2010 | Jacobs et al. |
| 2011/0149856 A1 | 6/2011 | Son et al. |
| 2014/0171062 A1* | 6/2014 | Fallgren ............... H04W 40/22 |
| | | 455/422.1 |

FOREIGN PATENT DOCUMENTS

WO  WO 2006/033034 A1  3/2006

OTHER PUBLICATIONS

Baker, et al.; "Low Energy Socially Cognizant Routing For Delay Tolerant Mobile Networks"; IEEE Military Comm. Conf; 2013; 6 pages.
Extended European Search Report dated Jul. 15, 2015 in connection with European Patent Application No. 15155050.6; 7 pages.
European Examination Report dated Feb. 3, 2017 in connection with European Application No. 15155050.6, 5 pages.

(Continued)

*Primary Examiner* — Santiago Garcia

(57) ABSTRACT

The present disclosure relates to a beacon relay method for an electronic device. A method to operate an electronic device is provided. The method includes receiving a beacon signal. The method also includes analyzing information in the received beacon signal. The method further includes determining whether to relay the beacon signal based on the analyzed information.

11 Claims, 13 Drawing Sheets

(56) References Cited

OTHER PUBLICATIONS

Ni et al.; "The Broadcast Storm Problem in a Mobile Ad Hoc Network"; MobiCom '99 Proceedings of the 5th Annual ACM/IEEE International Conference on Mobile Computing and Networking; Seattle, Washington, USA; Aug. 15-19, 1999; 12 pages.
Foreign Communication from Related Counterpart Application; European Patent Application No. 15155050.6; Communication Pursuant to Article 94(3) EPC dated Nov. 6, 2017; 6 pages.

* cited by examiner

METHOD AND APPARATUS FOR CONTROLLING OPERATIONS OF ELECTRONIC DEVICE

CROSS-REFERENCE TO RELATED APPLICATION(S)

The present application is related to and claims the benefit under 35 U.S.C. § 119(a) of a Korean patent application filed on Feb. 20, 2014 in the Korean Intellectual Property Office and assigned Serial No. 10-2014-0019610, the entire disclosure of which is hereby incorporated by reference.

TECHNICAL FIELD

This present disclosure relate to a beacon relay method for an electronic device and the electronic device.

BACKGROUND

There has been proposed a Bluetooth low energy (BLE) beacon using BLE as a communication technology replacing near field communication that is short-range wireless communication. The BLE beacon was commercialized in various fields including provision of location information, marketing, purchase, automatic check-in, or the like.

The near field communication (NFC) has an effective communication distance of about 4 cm to 20 cm, whereas the BLE beacon has an expanded effective communication distance of about 5 cm to 50 m. The NFC has a requirement that a separate chip is mounted in each mobile communication terminal. However, short-range wireless communication using the beacon is possible only with a BLE recognition function in the BLE beacon. Therefore, the BLE beacon is capable of economically providing a wireless communication service even in a wide room, compared with the NFC.

The BLE beacon has low power consumption to provide a wireless communication service only using a penny-sized battery for more than one year. Although the number of slave devices is limited to seven in classic Bluetooth technology, synchronization with slave devices, the number of which is not limited, is possible in the BLE 4.0 of the recent version.

SUMMARY

To address the above-discussed deficiencies, it is a primary object to provide a beacon relay method for an electronic device and the electronic device, which receive a beacon signal and relay the beacon signal to any other electronic device in various types of electronic device, such as a smartphone or a tablet PC.

In a first example, a beacon relay method is provided. The method includes selecting whether to relay a beacon signal to any other electronic device based on information in a received beacon signal in various types of electronic device, such as a smartphone or a tablet PC.

In a second example, a method to operate an electronic device is provided. The method includes receiving a beacon signal. The method also includes analyzing information in the received beacon signal. The method further includes determining whether to relay the beacon signal based on the analyzed information.

In a third example, an electronic device is provided. The electronic device includes a communication module configured to transmit and receive a beacon signal. The electronic device also includes a processor configured to determine whether to relay the beacon signal by analyzing information in the beacon signal.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
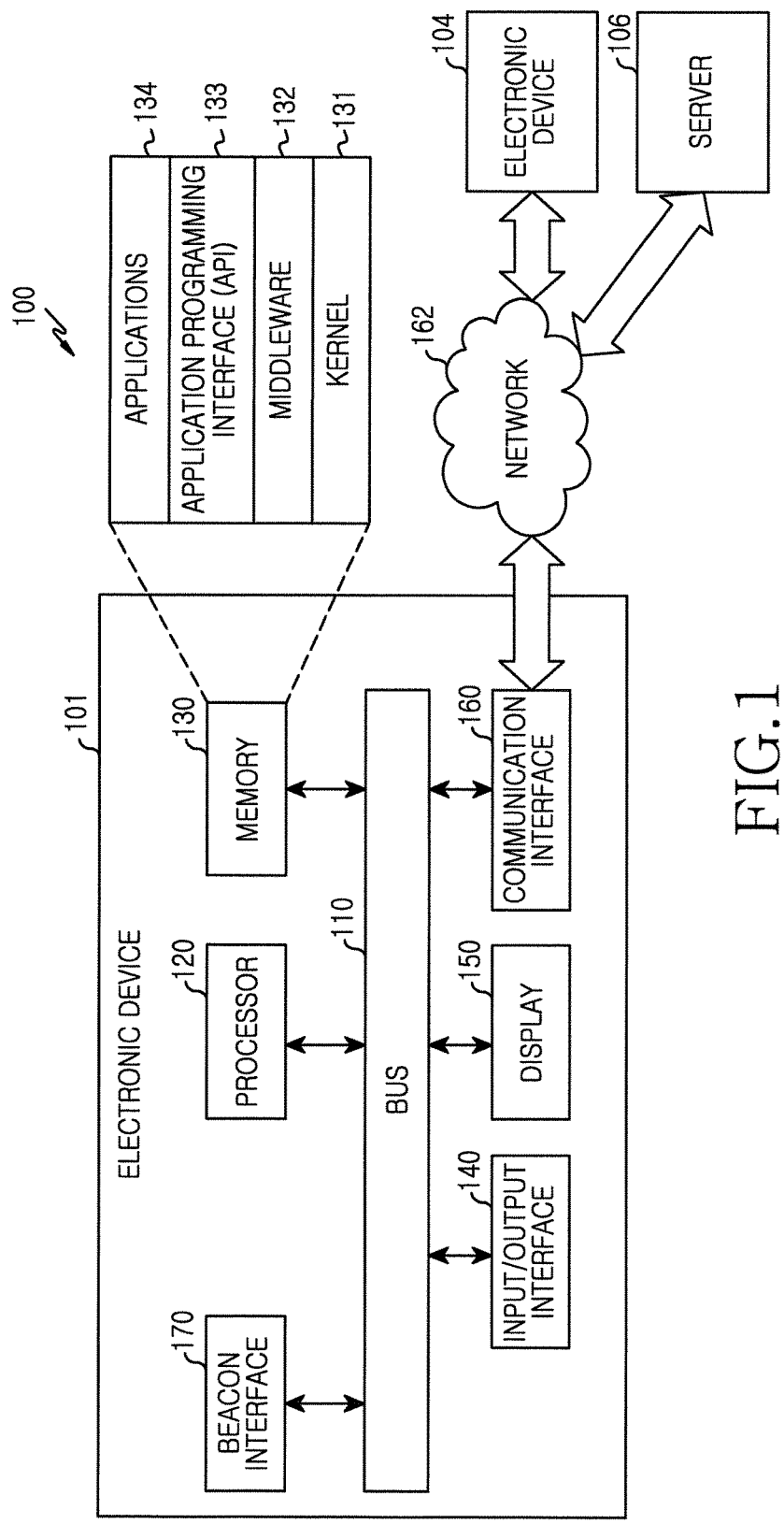
FIG. 1 is a diagram illustrating an example network environment including an electronic device according to this disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Hereinafter, the present disclosure will be described with reference to the accompanying drawings. While the present disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, or alternatives falling within the spirit and scope of the disclosure. In the drawings, similar reference numerals denote similar elements.

The terms such as "includes" and "may include" when used herein, specify the presence of stated features, operations, or elements, but do not limit one or more additional functions, operations or elements. It will be understood that terms such as "comprise", "include", and "have", when used herein, specify the presence of stated features, integers, steps, operations, elements, components, or combinations thereof, but do not preclude the presence or addition of one or more other features, integers, steps, operations, elements, components, or combinations thereof.

The term "or" as used herein is to be interpreted as an inclusive or meaning any one or any combination. For example, "A or B" is intended to include A, to include B, or to include both A and B." Although terms such as "first" and "second" is used herein to describe various elements, these elements should not be limited by these terms. For example, the terms do not limit the order or importance of the components. These terms are only used to distinguish one element from another element. For example, a first user equipment and a second user equipment are both an user equipment and represent different user equipments. For example, a first element could be termed a second element, and, similarly, a second element could be termed a first element, without departing from the scope of the present disclosure.

It will be understood that when an element is referred to as being "connected" or "coupled" to another element, it is directly connected or coupled to the other element or intervening elements is present. In contrast, when an element is referred to as being "directly connected" or "directly coupled" to another element, there are no intervening elements present.

The terms used herein are for the purpose of describing exemplary embodiments only and are not intended to be limiting of the present disclosure. As used herein, the singular forms "a", "an", and "the" are intended to include the plural forms as well, unless the context clearly indicates otherwise. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

An electronic device according to the present disclosure is a device having a communication function. Examples of the electronic device include at least one of a smart phone, a tablet personal computer, a mobile phone, a video telephone, an e-book reader, a desktop personal computer, a laptop personal computer, a netbook computer, a personal digital assistant (PDA), a portable multimedia player, a MP3 player, a mobile medicine equipment, a camera, or a wearable device (for example, a head-mounted-device (HMD) such as an electronic glasses, an electronic clothing, an electronic bracelet, an electronic necklace, an electronic appcessory, an electronic tattoo, or a smart watch).

In some embodiments, the electronic device is a smart home appliance having a communication function. The smart home appliance, for example, the electronic device includes at least one of a television, a digital video desk (DVD) player, a stereo, a refrigerator, an air-conditioner, a cleaner, an oven, a microwave oven, a washing machine, an air cleaner, a set-top box, a TV box (for example, Samsung HomeSync™, Apple TV™, or Google TV™), a game console, an electronic key, an electronic dictionary, a camcorder, or a digital photo frame.

According to some embodiments, the electronic device includes at least one of various types of medical equipment (for example, MRA (magnetic resonance angiography), MRI (magnetic resonance imaging), CT (computed tomography), an imaging device, or an ultrasound imaging device), a navigation device, a GPS receiver, an event data recorder (EDR), a flight data recorder (FDR), a vehicle infotainment device, a ship electronic equipment (for example, a ship navigation device or a gyro-compass device), an avionics device, a security equipment, a head unit for vehicle, a industrial robot, a home robot, an automatic teller's machine (ATM) of the financial institution, or a point of sales (POS) of a store.

According to an embodiment, the electronic device includes at least one of a furniture, a portion of a building/structure, an electronic board, an electronic signature receiving device, a projector, and various types of meters (for example, water, electricity, gas, or radio wave), each of which has a communication function. The electronic device according to the present disclosure is a combination of one or more of the above-described devices. An electronic device according to the present disclosure is a flexible device. It is obvious that the electronic device according to the present disclosure is not limited to the above-described devices.

The electronic device according to various embodiments of the present disclosure is described below with reference to accompanying drawings. The term "a user" described herein refers to a human being using the electronic device or an apparatus (such as an artificial intelligence electronic device) using the electronic device.

FIG. 1 is a diagram illustrating an example network environment 100 including an electronic device 101 according to this disclosure. Referring to FIG. 1, the electronic device 101 includes a bus 110, a processor 120, a memory 130, an input/output interface 140, a display 150, a communication interface 160, and a beacon interface 170. The beacon interface 170 is a component for transmitting and receiving a beacon signal and is included in or separate from the communication interface 160. The beacon interface 170 interworks with the processor. The bus 110 is a circuit that connects the above-described components and transfers a communication (for example, a control message) between the above-described components.

The processor 120 receives a command from the above-described other components (for example, the memory 130, the input/output interface 140, the display 150, the communication interface 160, or the like) through the bus 110, decodes the received command, and performs an arithmetic operation or data processing according to the decoded command.

The memory 130 stores a command or data received from or generated by the processor 120 or other components (for example, the input/output interface 140, the display 150, the communication interface 160, or the like). The memory 130 includes programming modules, such as a kernel 131, middleware 132, an application programming interface (API) 133, or applications 134. Each of the above-described programming modules are configured by software, firmware, hardware, or a combination of at least two thereof.

The kernel 131 controls or manages system resources (for example, the bus 110, the processor 120, or the memory 130) used to perform an operation or function implemented by the other programming modules, for example, the middleware 132, the API 133, or the application 134. Furthermore, the kernel 131 provides an interface for allowing the middleware 132, the API 133, or the applications 134 to access and control or manage respective components of the electronic device 101.

The middleware 132 performs a relay operation such that the API 133 or the application 134 communicates with the kernel 131 to transmit and receive data to and from the kernel 131. In addition, the middleware 132 performs control (for example, scheduling or load balancing) for task requests received from the application 134 in such a way that a priority of using the system resources (for example, the bus 110, the processor 120, or the memory 130) of the electronic device 101 is assigned to at least one application of the applications 134 according to the task requests.

The API 133 is an interface for allowing the applications 134 to control functions provided by the kernel 131 or the middleware 132, and includes, for example, at least one interface or function (for example, command) for file control, window control, image processing, or SMS message control.

According to the various embodiments, the application 134 includes a Short Message Service (SMS)/a Multimedia Messaging Service (MMS) application, an E-mail application, a calendar application, an alarm application, a healthcare application (such as an application for measuring a quantity of motion, a blood sugar, or the like), an environment informing application (such as an application for providing information on an atmospheric pressure, a humidity, a temperature, or the like), an application for determining a context of the electronic device 101, or the like. Additionally or alternatively, the applications 134 is an application associated with information exchange between the electronic device 101 and an external electronic device (for example, electronic device 104). The application associated with information exchange includes, for example, a notification relay application for relaying specific information to the external electronic device or a device management application for managing the external electronic device.

For example, the notification relay application includes a function of relaying notification information generated by other applications (for example, a SMS/MMS application, an e-mail application, a health care application or an environment information application) to the external electronic device (for example, electronic device 104) of the electronic device 101. Additionally or alternatively, the notification relay application receives notification information from, for example, an external electronic device (for example, the electronic device 104) and provides the notification information to the user. The device management application performs management (for example, installation, un-installation or updating) of a function (for example, the turn-on or turn-off of an external electronic device (or one or more components), or display brightness (or resolution) control) associated with at least a part of the external electronic device (for example, the electronic device 104) that communicates with the electronic device 101, an application executed in the external electronic device, and a service (for example, call service or message service) provided by the external electronic device.

According to various embodiments, the application 134 includes an application assigned according to characteristics (for example, the type of an electronic device) the external electronic device (for example, the electronic device 104). For example, when the external electronic device is a MP3 player, the applications 134 include an application for music playback. Similarly, when the external electronic device is mobile medical equipment, the applications 134 include an application for health care. According to an embodiment, the applications 134 include at least one of an application designated in the electronic device 101 or an application received from the external electronic device (for example, the server 106 or the electronic device 104).

The input/output interface 140 transfers an instruction or data input by a user through the input/output device (such as a sensor, a keyboard, or a touch screen) to the processor 120, the memory 130, or the communication interface 160 through, for example, the bus 110. For example, the input/output interface 140 provides data for a user's touch input through a touch screen to the processor 120. Further, the input/output interface 140 outputs instructions or data, which are received through the bus 110 from the processor 120, the memory 130, or the communication interface 160, through the input/output device (such as a speaker or a display). For example, the input/output interface 140 outputs voice data, which is processed by the processor 120, to the user through the speaker.

The display 150 displays various pieces of information (for example, multimedia data or text data) to the user. The communication interface 160 provides a connection for communications between the electronic device 101 and an external device (for example, the electronic device 104 or the server 106). For example, the communication interface 160 is connected to a network 162 through wireless communication or wired communication to communicate with the external device. The wireless communication includes at least one of WiFi (wireless fidelity), BT (Bluetooth), NFC (near field communication), GPS (global positioning system) or cellular communication (for example, LTE, LTE-A, CDMA, WCDMA, UMTS, WiBro or GSM). The wired communication includes at least one of USB (universal serial bus) communication, HDMI (high definition multimedia interface) communication, RS-232 (recommended standard 232) communication, or POTS (plain old telephone service) communication.

According to an embodiment, the network 162 is a telecommunications network. The telecommunications network includes at least one of a computer network, Internet, Internet of things (IOT), or a telephone network. According to an embodiment, a protocol (for example, a transport layer protocol, a data link layer protocol, or a physical layer protocol) for communication between the electronic device 101 and the external device is supported by at least one of the applications A134, the application programming interface 133, the middleware 132, the kernel 131 or the communication interface 160.

Figure 2:
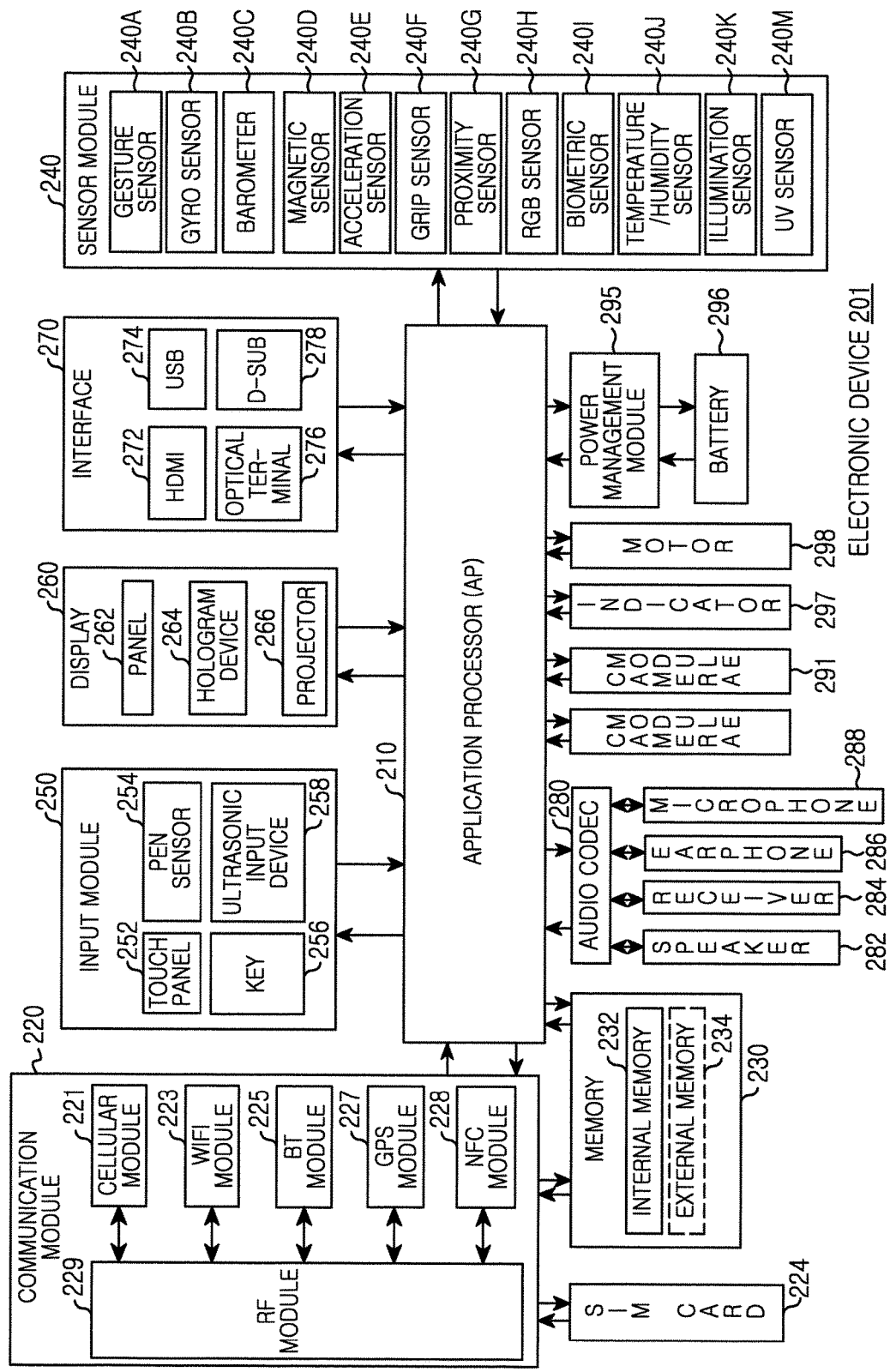
FIG. 2 is a block diagram of an example electronic device according to this disclosure.

FIG. 2 is a block diagram of an example electronic device 201 according to this disclosure. The electronic device 201 configures the whole or a part of the electronic device 101 illustrated in FIG. 1, for example. Referring to FIG. 2, the electronic device 201 includes at least one application processor (AP) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The AP 210 executes an operating system or application programs to control a plurality of hardware or software components connected to the AP 210, and perform data processing and arithmetic operations on various types of data including multimedia data. The AP 210 is implemented by using, for example, a system on chip (SoC). According to an embodiment, the AP 210 further includes a graphic processing unit (GPU).

The communication module 220 (for example, the communication interface 160) performs data transmission and reception during communication between the electronic device (for example, the electronic device 101) and other electronic devices (for example, the electronic device 104 or the server 106) connected to the electronic device 101 via a network. According to an embodiment, the communication module 220 includes a cellular module 221, a WiFi module 223, a Bluetooth (BT) module 225, a GPS module 227, an NFC module 228, and a radio frequency (RF) module 229.

The cellular module 221 provides a voice call service, a video call service, a short messaging service, an Internet service, or the like through a communication network (for example, LTE, LTE-A, CDMA, WCDMA, UMTS, WiBro, or GSM) The cellular module 321 performs identification and authentication of electronic devices in a communication network by using, for example, a subscriber identification module (for example, the SIM card 224). According to an embodiment, the cellular module 221 performs at least one of functions which the AP 210 is capable of providing. For example, the cellular module 221 performs at least a part of a multimedia control function.

According to an embodiment, the cellular module 221 includes a communication processor (CP). The cellular module 221 is implemented by using, for example, an SoC. Although the above-described component, such as the cellular module 221 (for example, a communication processor), the memory 230, or the power management module 295, is illustrated as being separate from the AP 210 in FIG. 2, the AP 210 is implemented to include at least one (for example, the cellular module 221) of the above-described components according to an embodiment.

According to an embodiment, the AP 210 or the cellular module 221 (for example, a communication processor) loads a command or data, received from at least one of a non-volatile memory and other components connected thereto, into a volatile memory and process the same. The AP 210 or the cellular module 221 stores data received from or generated by at least one of other components in the non-volatile memory.

Each of the WiFi module 223, the BT module 225, the GPS module 227, and the NFC module 228 includes a processor for processing data transmitted and received therethrough. Although the cellular module 221, the WiFi module 223, the BT module 225, the GPS module 227, and the NFC module 228 is illustrated as separate blocks in FIG. 2, at least two (for example, two or more) of the cellular module 221, the WiFi module 223, the BT module 225, the GPS module 227, and the NFC module 228 is included in one integrated chip (IC) or one IC package. For example, at least two of processors respectively corresponding to the cellular module 221, the WiFi module 222, the BT module 225, the GPS module 227, and the NFC module 228 (for example, a communication processor corresponding to the cellular module 221 and a WiFi processor corresponding to the WiFi module 223) is implemented using one SoC.

The RF module 229 performs transmission and reception of data, for example, transmission and reception of RF signals. Although not illustrated, the RF module 229 includes, for example, a transceiver, a power amplifier module (PAM), a frequency filter, or a low noise amplifier (LNA). The RF module 229 further includes a component for transmitting and receiving electromagnetic waves to and from free air for wireless communication, for example, a conductor or a conductive wire. Although the cellular module 221, the WiFi module 223, the BT module 225, the GPS module 227, and the NFC module 228 are illustrated as sharing one RF module 229 with one another in FIG. 2, at least one of the cellular module 221, the WiFi module 223, the BT module 225, the GPS module 227, and the NFC module 228 performs transmission and reception of RF signals through a separate RF module.

The SIM card 224 is a card including a subscriber identification module, and is inserted into a slot formed at a specific position of the electronic device. The SIM card 224 includes unique identification information (for example, integrated circuit card identifier (ICCID)) or subscriber information (for example, international mobile subscriber identity (IMSI)).

The memory 230 (for example, the memory 130) includes an internal memory 232 or an external memory 234. The internal memory 232 includes, for example, at least one of a volatile memory (for example, dynamic RAM (DRAM), static RAM (SRAM), or synchronous dynamic RAM (SDRAM)) or a non-volatile memory (for example, one time programmable (ROMOTPROM), programmable ROM (PROM), erasable and programmable ROM (EPROM), electrically erasable and programmable ROM (EEPROM), mask ROM, flash ROM, NAND flash memory, NOR flash memory).

According to an embodiment, the internal memory 232 is a solid state drive (SSD). The external memory 234 further includes a flash drive, for example, a compact flash (CF) card, a secure digital (SD) card, a micro secure digital (Micro-SD) card, a mini secure digital (Mini-SD) card, an extreme digital (xD) card, or a memory stick. The external memory 234 is functionally connected to the electronic device 201 through various types of interfaces. According to an embodiment, the electronic device 201 further includes a storage (or storage medium), such as a hard drive.

The sensor module 240 measures a physical amount or detects an operational state of the electronic device 201 and converts measured or detected information to electric signals. The sensor module 240 includes at least one of, for example, a gesture sensor 240A, a gyro sensor 240B, a barometer 240C, a magnetic sensor 240D, an acceleration sensor 240E, a grip sensor 240F, a proximity sensor 240G, a color sensor 240H (for example, a RGB (red-green-blue) sensor), a biometric sensor 240I, a temperature/humidity sensor 240J, an illumination sensor 240K, and an ultra violet (UV) sensor 240M. Additionally or alternatively, the sensor module 240 includes, for example, a E-nose sensor, an electromyography (EMG) sensor, an electroencephalogram (EEG) sensor, an electroencephalogram (ECG) sensor, an infrared (IR) sensor, an iris sensor, or a fingerprint sensor. The sensor module 240 further includes a control circuit for controlling at least one sensor included therein.

The input device 250 includes a touch panel 252, a (digital) pen sensor 254, a key 256, or an ultrasonic input device 258. The touch panel 252 detects a touch input by using at least one of a capacitive sensing method, a resistive sensing method, an infrared sensing method, and an ultrasonic sensing method, for example. The touch panel 252 further includes a control circuit. In the case of the capacitive sensing method, physical contact or proximity detection are possible. The touch panel 252 further includes a tactile layer. In this case, the touch panel 252 provides a tactile response to a user.

The pen sensor 254 is implemented, for example, in the same or similar method as that of receiving a user's touch input or by using a separate sheet for detection. The key 256 includes, for example, a physical button, an optical key, or a key pad. The ultrasonic input device 258 is a device for allowing the electronic device 201 to detect sound waves using a microphone (such as a microphone 288) and identify data, through an input unit for generating an ultrasonic signal, and is capable of wireless recognition. According to an embodiment, the electronic device 201 receives a user input from an external device (for example, a computer or a server) connected thereto by using the communication module 220.

The display 260 (for example, the display 150) includes a panel 262, a hologram device 264, or a projector 266. The panel 262 is, for example, a liquid crystal display (LCD) panel or an active-matrix organic light-emitting diode (AM-OLED) panel. The panel 262 is implemented to be, for example, flexible, transparent or wearable. The panel 262 and the touch panel 862 is configured as one module. The hologram device 264 displays a three-dimensional image in the air using interference of light. The projector 266 projects light onto a screen to display an image. The screen is disposed inside or outside the electronic device 201 for example. According to an embodiment, the display 260 further includes a control circuit for controlling the panel 262, the hologram device 264, or the projector 266.

The interface 270 includes, for example, a high-definition multimedia interface (HDMI) 272, a universal serial bus (USB) 274, an optical interface 276 or a D-sub (D-subminiature) 278. The interface 270 is included in, for example, the communication interface 160 illustrated in FIG. 1. Additionally or alternatively, the interface 270 includes, for example, a MHL (mobile high-definition link) interface, a SD (secure Digital) card/MMC (multi-media card) interface or an IrDA (infrared data association)-compatible interface.

The audio module 280 performs bidirectional conversion between sound and electric signals. At least one component of the audio module 280 is included in, for example, the input/output interface 140 illustrated in FIG. 1. The audio module 280 processes sound information input or output through a speaker 282, a receiver 284, an earphone 286, or a microphone 288.

The camera module 291 is a device for capturing a still image or a moving image. According to an embodiment, the camera module 591 includes one or more image sensors (for example, a front sensor or a rear sensor), a lens, an image signal processor (ISP), or a flash (for example, an LED or xenon lamp). The power management module 295 manages power of the electronic device 201. The power management module 295 includes, for example, a power management integrated circuit (PMIC), a charger IC (integrated circuit), or a battery or fuel gauge.

The PMIC is mounted on, for example, an integrated circuit or a SoC semiconductor. A charging method includes a wired charging method and a wireless charging method. The charger IC charges a battery and prevents an overvoltage or overcurrent from being applied from a charger. According to an embodiment, the charger IC includes a charger IC for at least one of a wired charging method and a wireless charging method. The wireless charging method includes, for example, an inductive coupling method, an electromagnetic (EM) radiation method, and a magnetic resonant coupling method. An additional circuit for wireless power transfer, for example, a coil loop, a resonant circuit, or a rectifier is further included.

The battery gage measures, for example, a remaining power of the battery 296, or a voltage, a current, a temperature during charging. The battery 296 stores and generates electricity and supply power to the electronic device 201 using the stored or generated electricity. The battery 296 includes, for example, a rechargeable battery or a solar battery.

The indicator 297 indicates a specific state of the electronic device 201 or a part (for example, the AP 310) of the electronic device 201, for example, a booting state, a messaging state, or a charging state. The motor 298 converts an electrical signal to a mechanical vibration. The electronic device 201 includes a processing device (for example, graphics processing unit (GPU)) for supporting mobile TV. The processing device for supporting mobile TV processes standards-compliant media data, such as DMB (digital multimedia broadcasting) data, DVB (digital video broadcasting) data, or media flow data.

Each of the above-descried elements according to the present disclosure is configured by one or more components and the name of each element varies depending on the type of an electronic device. The electronic device according to the present disclosure is configured by including at least one of the above-described elements, and some elements are omitted from or additional element are further included in the electronic device. In addition, some of the elements of the electronic device according to the present disclosure are combined into one entity to perform functions of relevant elements before combination.

A method for relaying a beacon in an electronic device and the electronic device according to various embodiments of the present disclosure will be described below in detail. The electronic device according to various embodiments of the present disclosure can be various types of electronic device, such as a smartphone or a tablet PC, and can be configured by including elements illustrated in FIGS. 1 and 2.

Figure 3:
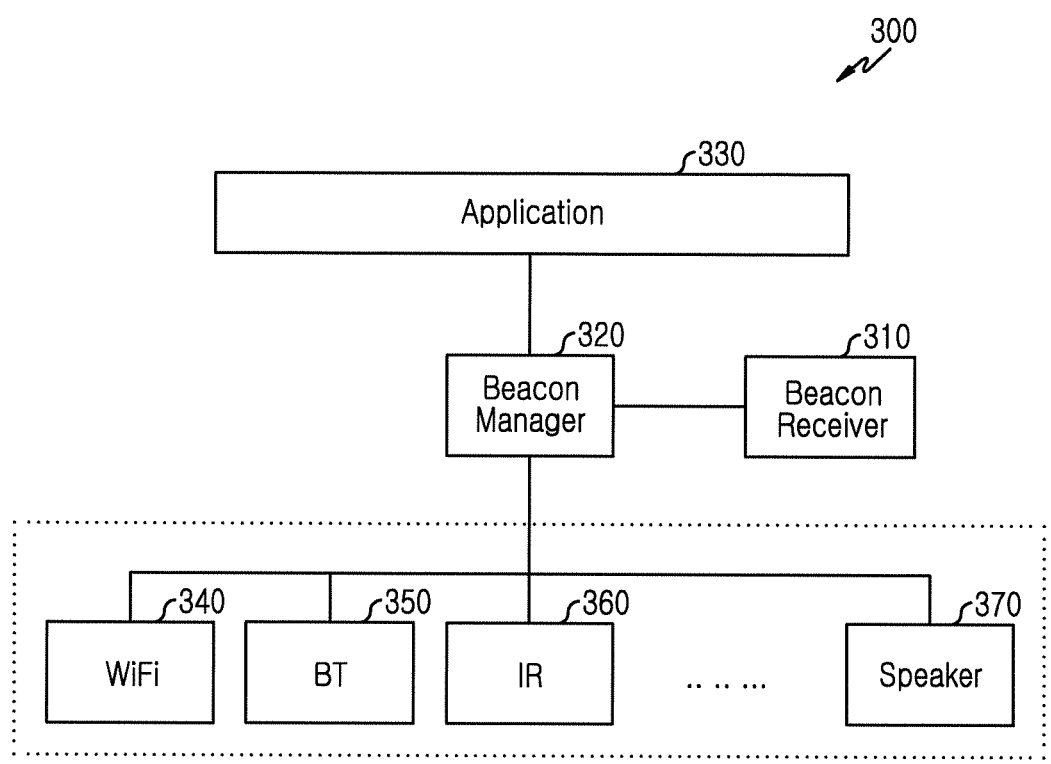
FIG. 3 is a diagram illustrating an example of a partial configuration of an electronic device according to this disclosure.

FIG. 3 is a diagram illustrating an example of a partial configuration of an electronic device 300 according to this disclosure. Referring to FIG. 3, the electronic device 300 includes a beacon receiver 310, a beacon manager 320, an application 330, a WiFi module 340, a Bluetooth module 350, an infrared module 360, a speaker 370, or the like. The beacon manager 320 drives the beacon receiver 310 when the application 330 is executed. The beacon receiver 310 outputs a beacon signal received from a wireless network to the beacon manager 320.

The beacon manager 320 analyzes information in the beacon signal and determines whether to relay the beacon signal to any other electronic device. When it is determined to relay the beacon signal, the beacon manager 320 controls at least one of the WiFi module 340, the Bluetooth module 350, the infrared module 360, and the speaker 370 so as to relay the beacon signal to another electronic device.

The beacon receiver 310 is included in at least one of or is separate from the WiFi module 340, the Bluetooth module 350, the infrared module 360, and the speaker 370. The beacon manager 320 is included in or be separate from the processor 120 as described above with reference to FIG. 1.

Hereinafter, it is assumed that the beacon manager 320 is included in the processor 120 and the beacon receiver 310 is included in the Bluetooth module 350.

Figure 4:
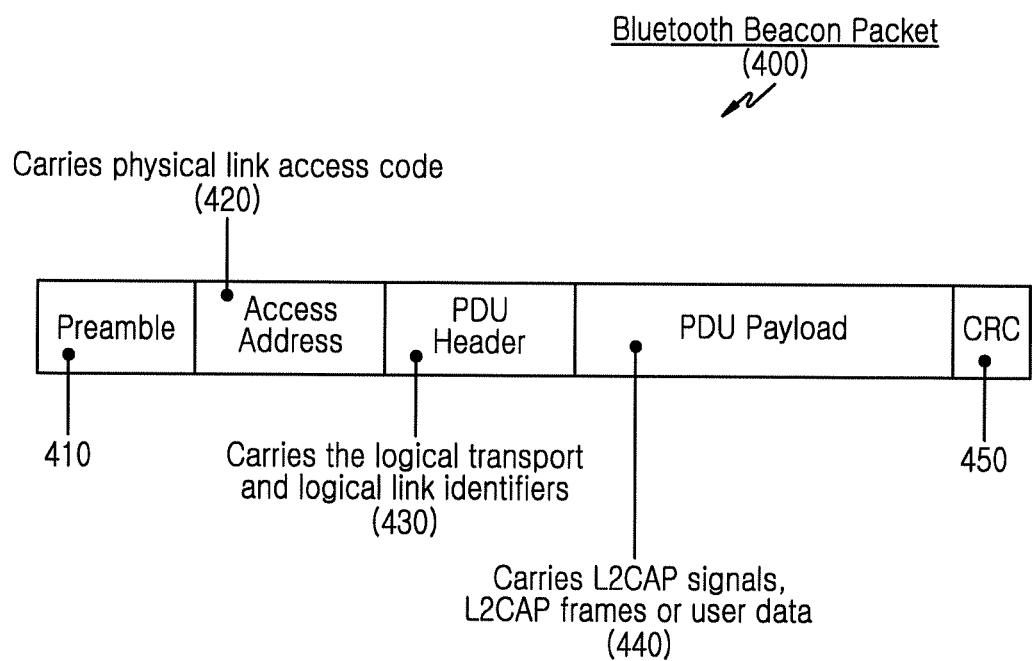
FIG. 4 is a diagram illustrating an example configuration for a BLE beacon packet according to this disclosure.
Figure 5:
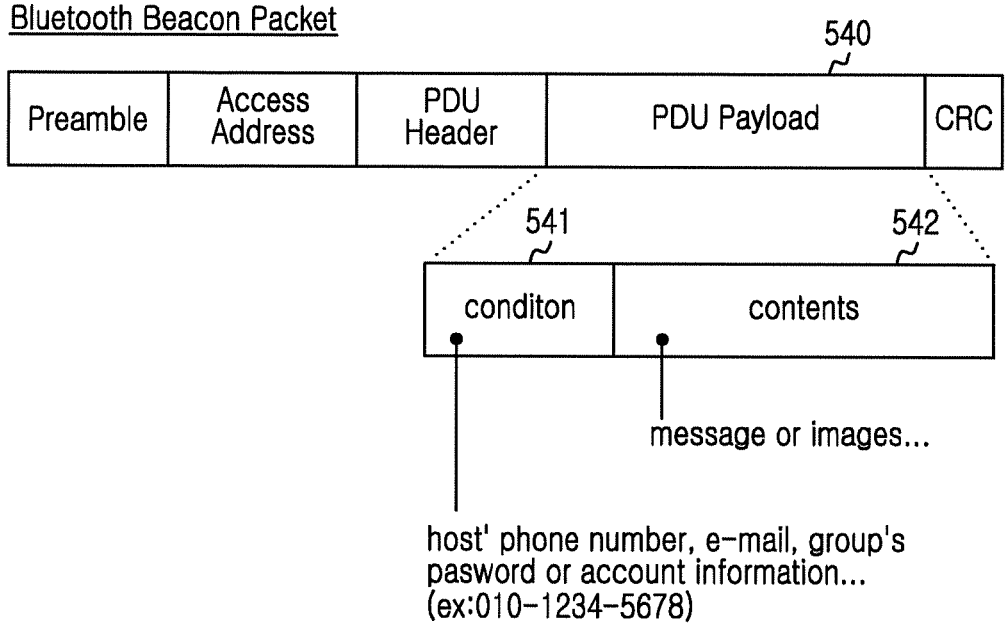
FIGS. 5 to 8 are diagrams illustrating example configurations in which relay condition information is included in a BLE beacon packet according to this disclosure.

FIG. 4 is a diagram illustrating an example configuration of a BLE beacon packet 400 to which various embodiments of the present disclosure are applied. Referring to FIG. 4, the BLE beacon packet 400 includes a preamble 410, an access address 420, a packet data unit (PDU) header 430, a PDU payload 440, a cyclical redundancy check (CRC) 450, or the like.

The preamble 410 includes information related to frequency synchronization, symbol timing estimation, automatic gain control, or the like. The access address 420 includes information related to a physical link access code or the like. The PDU header 430 includes information related to logical transport, logical link identifiers, or the like.

The PDU payload 440 includes information related to logical link control and adaptation protocol (L2CAP) signals, L2CAP frames, user data, or the like, and the CRC 450 includes information related to data transmission error detection or the like. The user data includes media data, such as audio, video, text, or the like related to advertising for example.

FIGS. 5 to 8 are diagrams illustrating example configuration in which relay condition information 541, 641, 741 or 841 is included in a BLE beacon packet according to this disclosure. In a first embodiment, referring to FIG. 5, a PDU payload 540 of the BLE beacon packet includes contents 542, such as various messages or images. Also, the PDU payload 540 includes relay condition information 541 for allowing an electronic device which receives the BLE beacon packet to determine whether to relay the beacon packet to another electronic device. For example, for the relay condition information 541, there is used a host's phone number, an e-mail address, a group password, or a social networking service (SNS) account information, or the like of an electronic device which first transmits the BLE beacon packet.

Figure 6:
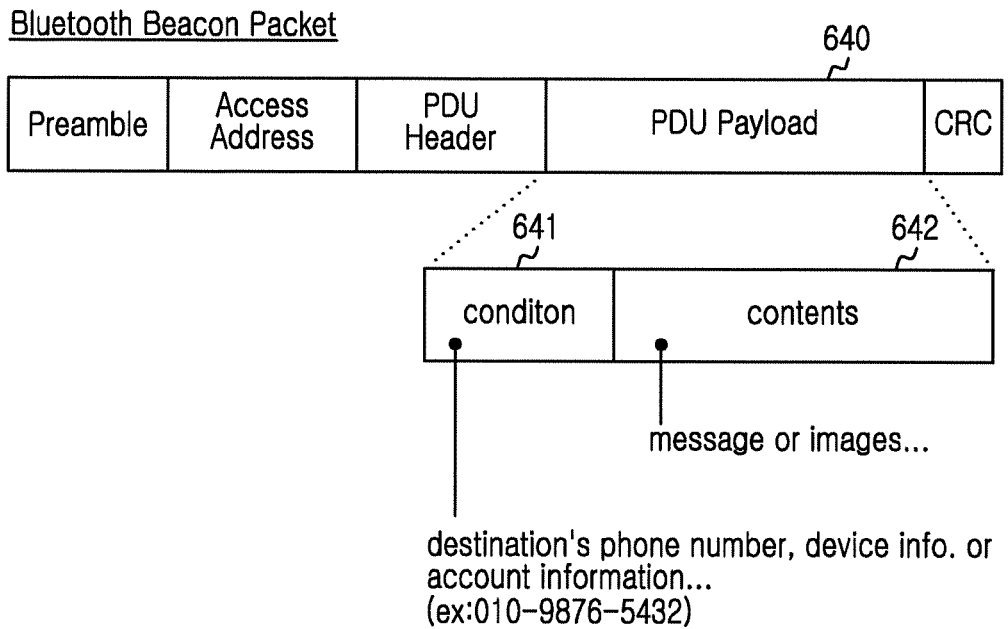

In a second embodiment, referring to FIG. 6, a PDU payload 640 of the BLE beacon packet includes contents 642, such as various messages or images, and relay condition information 641. For example, for the relay condition information 641, there is used a destination's phone number, device information, SNS account information, or the like as terminal identification information of an electronic device corresponding to a destination that is to receive the BLE beacon packet.

Figure 7:
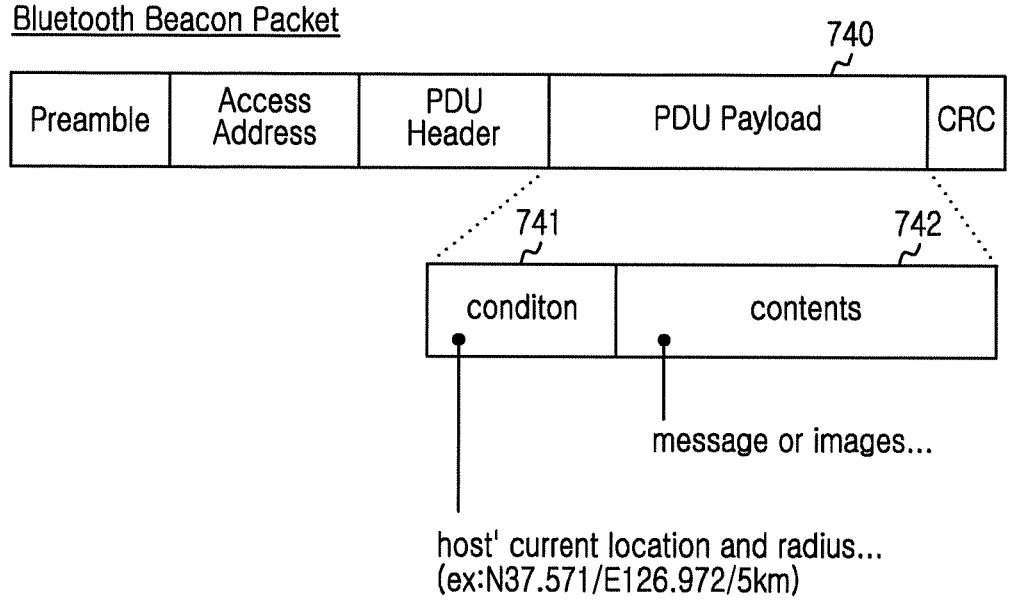

In a third embodiment, referring to FIG. 7, a PDU payload 740 of the BLE beacon packet includes contents 742, such as various messages or images, and relay condition information 741. For example, the relay condition information 741 is information for limiting an area to which the BLE beacon packet is to be relayed, and includes current location information of an electronic device which first transmits the BLE beacon packet (such as a host's current location) or radius information for limiting a transmission distance.

Figure 8:
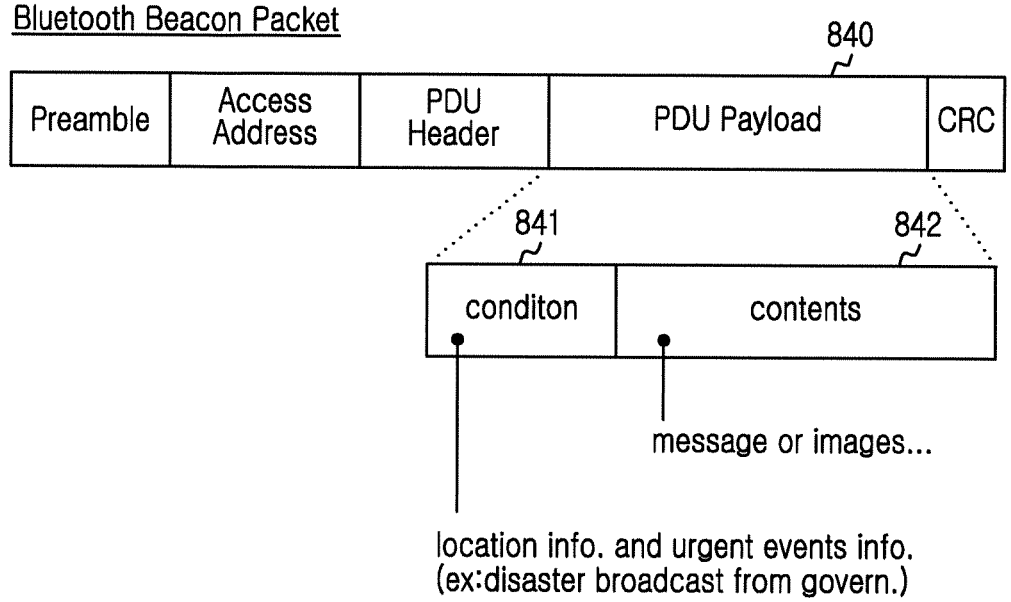

In fourth embodiment, referring to FIG. 8, a PDU payload 840 of the BLE beacon packet includes contents 842, such as various messages or images, and relay condition information 841. For example, as the relay condition information 841, location information at which an emergency situation, an urgent situation, or the like occurs, urgent events information, or the like is used. The relay condition information is included in the PDU payload of the BLE beacon packet or is included in the PDU header of the BLE beacon packet as described above. Alternatively, the relay condition information is included in one of a preamble and an access address of the BLE beacon packet.

Figure 9:
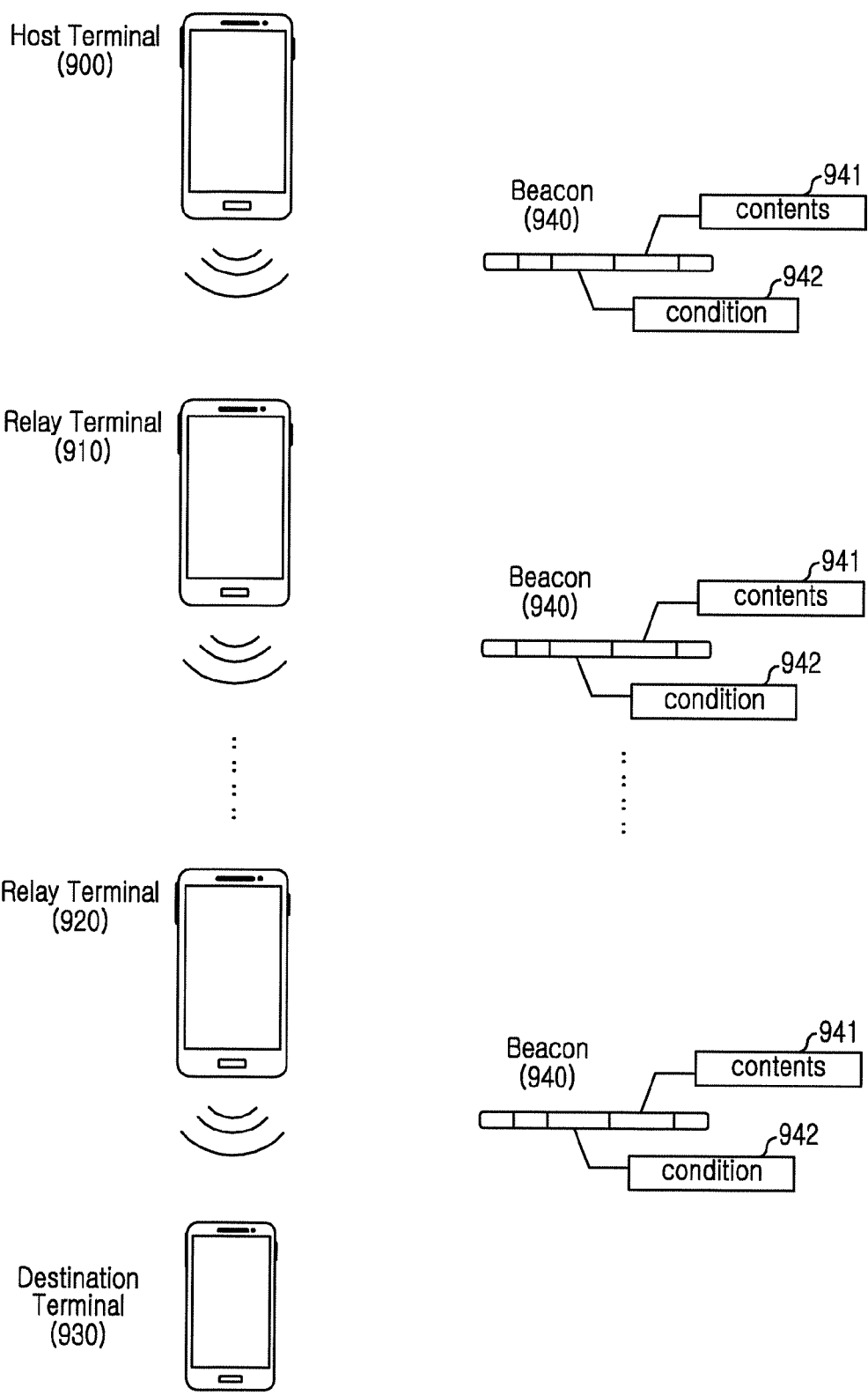
FIG. 9 is a diagram illustrating an example beacon relay process according to this disclosure.

FIG. 9 is a diagram illustrating an example beacon relay process according to this disclosure. Referring to FIG. 9, an electronic device which first transmits a beacon signal 940 is referred to as a "host terminal" 900, an electronic device that receives the beacon signal and relays the beacon signal to another electronic device is referred to as a "relay terminal" 910 or 920, and an electronic device that finally receives the beacon is referred to as a "destination terminal" 930. Various other names can also be used.

The beacon signal 940 includes various types of contents 941 to be relayed through beacon communication, relay condition information 942 for allowing the relay terminal 910 or 920 to determine whether to relay the beacon signal to any other electronic device, or the like. The relay condition information 942 can be called any other name.

As described above, the contents 941 are included in the PDU payload. The relay condition information 942 is included in the PDU payload or the PDU header 430. Alternatively, the relay condition information 942 is included in one of a preamble and an access address.

When the beacon signal 940 which is first transmitted by the host terminal 900 is received by the first relay terminal 910, the first relay terminal 910 analyzes the relay condition information 942 included in the beacon signal 940 and then determines whether to relay the received beacon signal 940 to any other electronic device. When it is determined to relay the beacon signal, the first relay terminal 910 transmits the beacon signal 940 to any other electronic device.

When the beacon signal 940 which is transmitted by the first relay terminal 910 is received by the second relay terminal 920, the second relay terminal 920 analyzes the relay condition information 942 included in the beacon signal 940 and then determines whether to relay the received beacon signal 940 to any other electronic device. When it is determined to relay the beacon signal, the second relay terminal 920 transmits the beacon signal 940 to any other electronic device.

When the beacon signal 940 which is transmitted by the second relay terminal 920 is received by the destination terminal 930, the destination terminal 930 analyzes the relay condition information 942 included in the beacon signal 940 and then determines whether to relay the received beacon signal 940 to any other electronic device. When it is determined not to relay the beacon signal, the destination terminal 930 does not transmit the beacon signal 940 to any other electronic device.

The contents 941 included in the beacon signal 940 is processed such that the contents is played back by the respective terminals 910, 920 and 930, in a course of passing through a communication path formed by the first relay terminal 910, the second relay terminal 920, and the destination terminal 930. Alternatively, the contents 941 are limited in its use such that the destination terminal 930, which finally receives the beacon signal 940, only plays back the contents 941.

Figure 10:
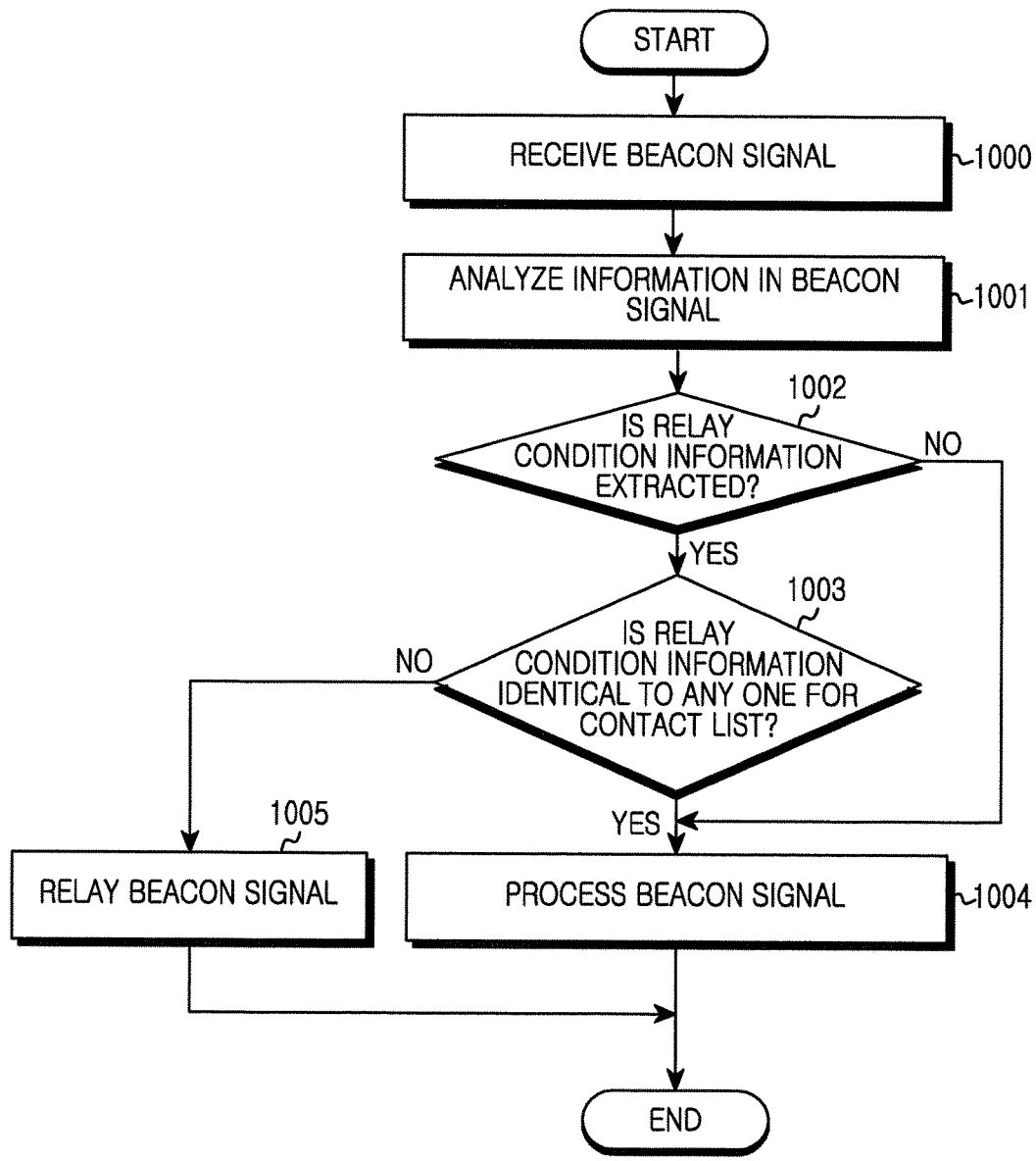
FIG. 10 is an operation flowchart of an example beacon relay method for an electronic device according to this disclosure.

FIG. 10 is a flowchart of an example beacon relay method for an electronic device according to this disclosure. For example, it is assumed that the beacon receiver 310 and the beacon manager 320 included in various types of electronic devices, such as a smartphone or a tablet PC, are respectively included in the Bluetooth module 350 of FIG. 3 and the processor 120 of FIG. 1.

Referring to FIG. 10, the processor 120 receives a beacon signal through the Bluetooth module 350 in operation 1000 and analyzes information in the received beacon signal in operation 1001. When relay condition information is extracted from the analyzed information in operation 1002, the processor 120 determines whether the relay condition information is identical to any one contact from a contact list stored in the electronic device in operation 1003. For example, as described with reference to FIG. 5, the relay condition information 541 extracted from the PDU payload 540 is any one of a phone number, an e-mail address, a group password, and SNS account information of an electronic device which first transmits the beacon signal.

When, for example, any one of a phone number, an e-mail address, a group password, and SNS account information in the contact list stored in the electronic device is identical to the relay condition information, the processor 120 processes the received beacon signal to be played back in operation 1004. Otherwise, the processor 120 relays the received beacon signal to another electronic device in operation 1005. That is, when the relay condition information is not extracted in operation 1002, or when the relay condition information is identical to any one of pieces of information of the contact list stored in the electronic device in operation 1003, the processor 120 processes the received beacon signal to be played back without relaying the received beacon signal to another electronic device.

On the other hand, when the relay condition information is not identical to any one of pieces of information of the contact list stored in the electronic device in operation 1003, the processor 120 relays the received beacon signal to another electronic device. In this case, the beacon signal is relayed to another electronic device and, at the same time, be processed to be played back.

Figure 11:
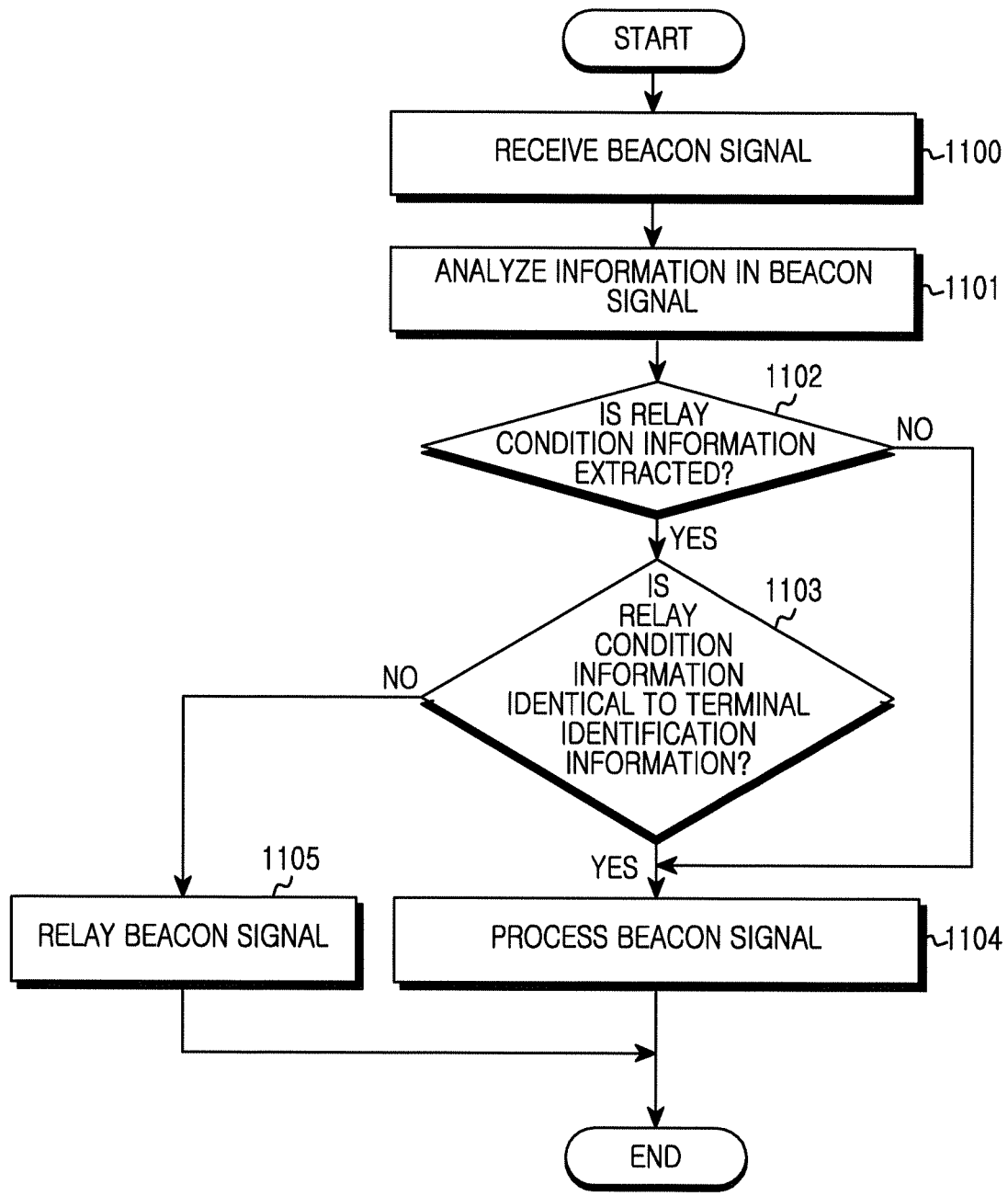
FIG. 11 is an operation flowchart of an example beacon relay method for an electronic device according to this disclosure.

FIG. 11 is an operation flowchart of an example beacon relay method for an electronic device according to this disclosure. As described above with reference to FIG. 10, it is assumed that the beacon receiver 310 and the beacon manager 320 are respectively included in the Bluetooth module 350 and the processor 120.

Referring to FIG. 11, the processor 120 receives a beacon signal through the Bluetooth module 350 in operation 1100 and analyzes information in the received beacon signal in operation 1101. When relay condition information is extracted from the analyzed information in operation 1102, the processor 120 determines whether the relay condition information is identical to terminal identification information assigned to the electronic device in operation 1103. For example, as described with reference to FIG. 6, the relay condition information 641 extracted from the PDU payload 640 is terminal identification information of an electronic device corresponding to a destination which is to receive the beacon signal and, is any one of a destination's phone number, device information, and SNS account information.

When the terminal identification information assigned to the electronic device, for example, any one of a phone number, device information, and SNS account information is identical to the relay condition information, the processor 120 processes the received beacon signal to be played back in operation 1104. Otherwise, the processor 120 relays the received beacon signal to another electronic device in operation 1105. That is, when the relay condition information is not extracted in operation 1102, or when relay condition information is identical to any one of the terminal identification information assigned to the electronic device in operation 1103, the processor 120 processes the received beacon signal to be played back without relaying the received beacon signal to another electronic device.

On the other hand, when the relay condition information is not identical to the terminal identification information assigned to the electronic device in operation 1103, the processor 120 relays the received beacon signal to another electronic device. In this case, the beacon signal is relayed to another electronic device and, at the same time, be processed to be played back.

Figure 12:
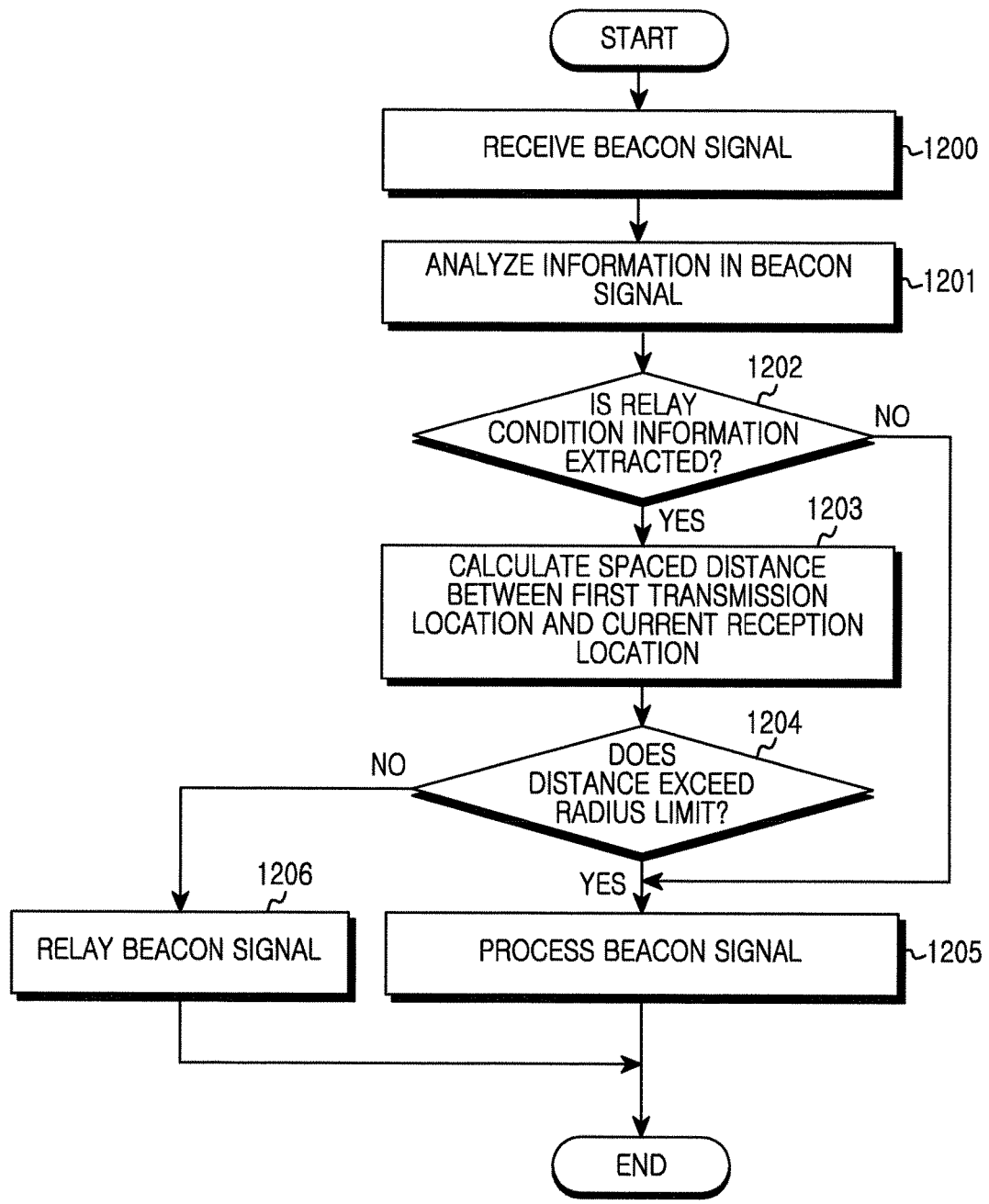
FIG. 12 is an operation flowchart of an example beacon relay method for an electronic device according to this disclosure.

FIG. 12 is an operation flowchart of an example beacon relay method for an electronic device according to this disclosure. As described above with reference to FIG. 12, it is assumed that the beacon receiver 310 and the beacon manager 320 are respectively included in the Bluetooth module 350 and the processor 120.

Referring to FIG. 12, the processor 120 receives a beacon signal through the Bluetooth module 350 in operation 1200, and analyzes information in the received beacon signal in operation 1201. When relay condition information is extracted from the analyzed information in operation 1202, the processor 120 calculates a spaced distance between a location of an electronic device which first transmits the beacon signal and a location of an electronic device which receives the beacon signal. For example, as described with reference to FIG. 7, the relay condition information 741 extracted from the PDU payload 740 is radius information for limiting current location information and a transmission distance of the electronic device which first transmits the beacon signal.

At operation 1203, the processor 120 calculates a spaced distance between a location at which the beacon signal is first transmitted and a current location at which the beacon signal is received by using the current location information detected by the GPS module 277 of FIG. 2 and the current location information extracted as the relay condition information. The processor 120 determines whether the calculated spaced distance exceeds a radius limit of the radius information extracted as the relay condition information in operation 1204. When it is determined that the spaced distance exceeds the radius limit, the processor 120 processes the beacon signal to be played back in operation 1205. When it is determined that the spaced distance does not exceed the radius limit, the processor 120 relays the received beacon signal to another electronic device in operation 1206.

That is, when the relay condition information is not extracted in operation 1202, or when the spaced distance exceeds the radius limit of the radius information in operation 1204, the processor 120 processes the beacon signal to be played back without relaying the received beacon signal to another electronic device. In this case, the processor 120 may not relay the beacon signal to another electronic device and at the same time, may not process the beacon signal to be played back.

On the other hand, when the spaced distance does not exceed the radius limit of the radius information in operation 1204, the processor 120 relays the received beacon signal to another electronic device. In this case, the beacon signal is relayed to another electronic device and at the same time, be processed to be played back.

Figure 13:
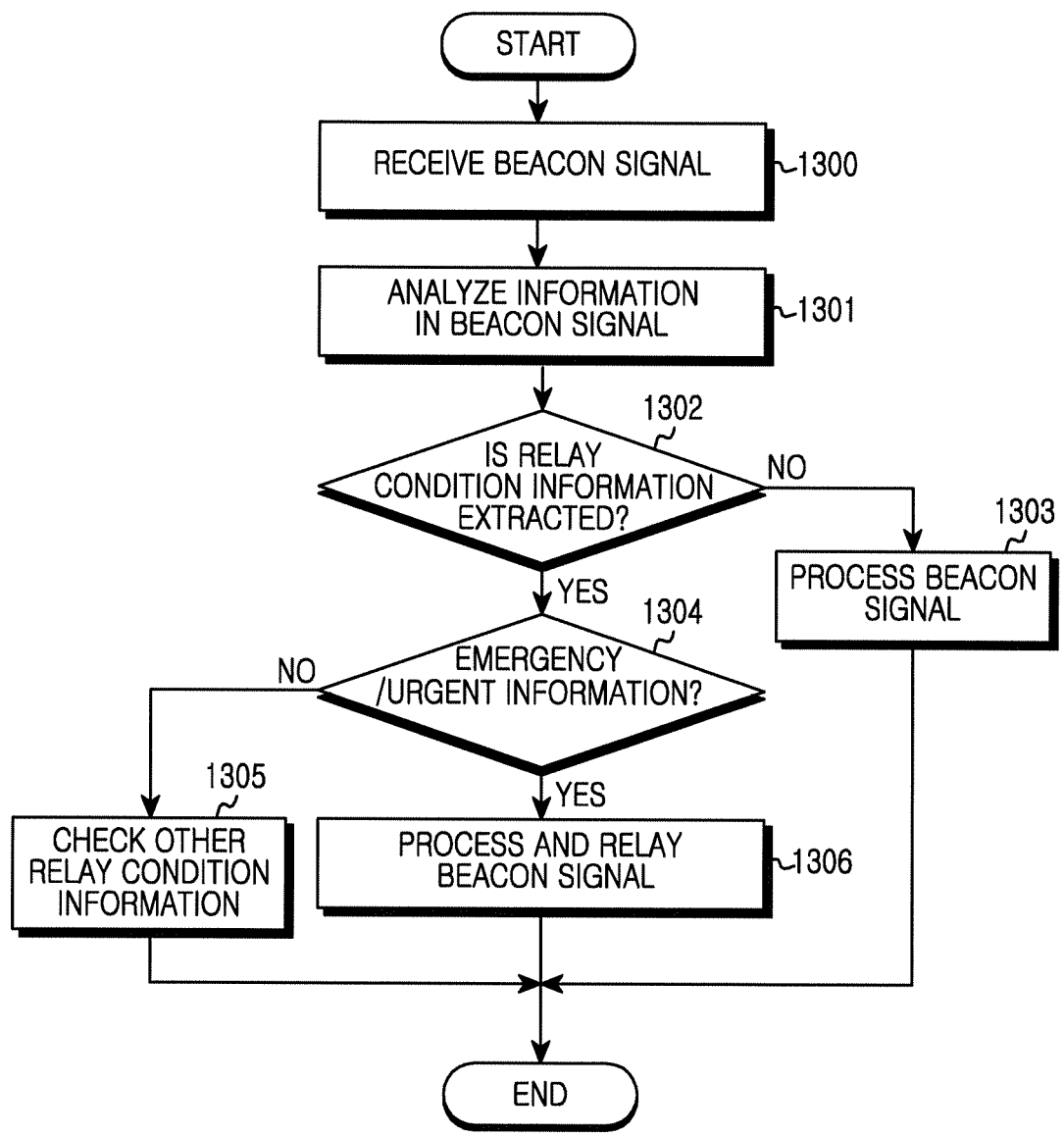
FIG. 13 is an operation flowchart of an example beacon relay method for an electronic device according to this disclosure.

FIG. 13 is an operation flowchart of an example beacon relay method for an electronic device according to this disclosure. As described above with reference to FIG. 10, it is assumed that the beacon receiver 310 and the beacon manager 320 are respectively included in the Bluetooth module 350 and the processor 120.

Referring to FIG. 13, the processor 120 receives a beacon signal through the Bluetooth module 350 in operation 1300, and analyzes information in the received beacon signal in operation 1301. When relay condition information is not extracted from the analyzed information in operation 1302, the processor 120 processes the beacon signal in operation 1303. When relay condition information is extracted from the analyzed information, the processor 120 determines whether the relay condition information is information corresponding to an emergency or urgent situation at operation 1304. For example, the relay condition information 841 extracted from the PDU payload 840 as described above with reference to FIG. 8 includes location information at which an emergency or urgent situation occurs, emergency event information or the like.

When the relay condition information is not emergency or urgent information, the processor 120 checks other relay condition information in operation 1305. When the relay condition information is emergency or urgent information, in operation 1306 the processor 120 processes the received beacon signal and simultaneously relays the received beacon signal to another electronic device. That is, when the relay condition information is information corresponding to an emergency or urgent situation, the processor 120 processes the received beacon signal to be played back and simultaneously relays the received beacon signal to another electronic device, thereby allowing the emergency or urgent information to be spread rapidly and widely.

According to various embodiments of the present disclosure, when an operation for relaying the beacon signal is not smoothly performed, a communication module for transmitting a beacon signal is switched discretionally. For example, in a case the beacon signal has been received through the Bluetooth module, when the Bluetooth module does not operate smoothly to relay the bacon signal to another electronic device, another communication module, such as the WiFi module, the infrared module, or the speaker is used to relay the beacon signal to the another electronic device.

According to various embodiments of the present disclosure, it is possible to more widely expand a communication range of a wireless communication network using the beacon signal in such a way that various types of electronic devices, such as a smartphone or a tablet PC, receive the beacon signal and relay the beacon signal to any other electronic device. Furthermore, it is possible to effectively reduce communication traffics of a wires communication network using the beacon signal by selectively determining whether to relay the beacon signal to any other electronic device based on information in the received beacon signal.

The methods according to the embodiments described in the claims or specification of the present disclosure is implemented by hardware, software, or a combination thereof. When the methods are implemented by software, a computer-readable storage medium is provided to store one or more programs (software modules). The one or more programs stored in the computer-readable storage medium is configured for execution by one or more processors 120 in an electronic device. The one or more programs include instructions for causing the electronic device to execute the methods according to the exemplary embodiments described in the claims or specification of the present disclosure.

These programs (software modules or software) is stored in a random access memory (RAMs), a nonvolatile memory including a flash memory, a read only memory (ROM), an electrically erasable programmable ROM (EEPROM), a magnetic disc storage device, a compact disk-ROM (CD-ROM), a digital video disk (DVD), another type of optical storage device, or a magnetic cassette. Also, the programs are stored in a memory configured by a combination of some or all of such storage devices. Also, each of the memories can be provided in plural.

Also, the programs are stored in an attachable storage device that can be accessed by the electronic device through a communication network such as Internet, Intranet, local area network (LAN), wireless LAN (WLAN), or storage area network (SAN), or through a communication network configured by a combination thereof. This storage device is connected through an external port to the electronic device performing the exemplary embodiments of the present disclosure. Also, a separate storage device on a communication network is connected to the electronic device performing the exemplary embodiments of the present disclosure.

In the embodiments of the present disclosure, the components included therein are expressed in a singular form or a plural form depending on the embodiments. The expressions of the singular form or the plural form have been properly selected depending on a situation for convenience of description. The various embodiments of the present disclosure are not limited to a singular component or plural components. Any elements expressed in the singular form herein are meant to also include the plural form and vice versa.

While the disclosure has been shown and described with reference to certain exemplary embodiments thereof, it will be understood by those skilled in the art that various changes in form and details is made therein without departing from the spirit and scope of the disclosure as defined by the appended claims. Therefore, the scope of the disclosure is defined not by the detailed description of the disclosure but by the appended claims, and all differences within the scope will be construed as being included in the present disclosure.

What is claimed is:

1. A method to operate an electronic device, the method comprising:
   receiving a beacon packet from a first electronic device via wireless communication links based on Bluetooth low energy (BLE);
   identifying, from the beacon packet, identification information of a destination electronic device, wherein the identification information is included in a packet data unit (PDU) payload of the beacon packet;
   determining whether the identification information of the destination electronic device corresponds to an identifier of the electronic device;
   if it is determined that the identification information of the destination electronic device does not correspond to the identifier of the electronic device, generating another beacon packet comprising the identification information; and
   broadcasting the other beacon packet to relay the beacon packet to a second electronic device.

2. The method of claim 1, further comprising:
   identifying, from the beacon packet, contact information of a host electronic device which first transmitted the beacon packet;
   determining whether the contact information corresponds to a piece of a contact list stored in the electronic device; and
   if it is determined that the contact list does not correspond to the piece of the contact list stored in the electronic device, generating another beacon packet comprising the contact information.

3. The method of claim 1, further comprising:
identifying, from the beacon packet, a location at which the beacon packet is first transmitted by a host electronic device, and limit radius;
calculating a spaced distance between the location and a current location at which the beacon packet is received; and
if it is determined that the calculated spaced distance is equal to or shorter than the limit radius, generating another beacon packet comprising the location and the limit radius.

4. The method of claim 1, further comprising, if it is determined that the beacon packet comprises emergency or urgent information, processing the beacon packet to be played back and generate another beacon packet to the second electronic device.

5. An electronic device comprising a processor configured to:
receive a beacon packet from a first electronic device via wireless communication links based on Bluetooth low energy (BLE);
identify, from the beacon packet, identification information of a destination electronic device, wherein the identification information is included in a packet data unit (PDU) payload of the beacon packet;
determine whether the identification information of the destination electronic device corresponds to an identifier of the electronic device;
if it is determined that the identification information of the destination electronic device does not correspond to the identifier of the electronic device, generate another beacon packet comprising the identification information; and
broadcasting the other beacon packet to relay the beacon packet to a second electronic device.

6. The electronic device of claim 5, wherein the processor is further configured to:
identify, from the beacon packet, contact information of a host electronic device which first transmitted the beacon packet;
determine whether the contact information corresponds to a piece of a contact list stored in the electronic device; and
if it is determined that the contact list does not correspond to the piece of the contact list stored in the electronic device, generate another beacon packet comprising the contact information.

7. The electronic device of claim 5, wherein the processor is further configured to:
identify, from the beacon packet, a location at which the beacon packet is first transmitted by a host electronic device, and limit radius;
calculate a spaced distance between the location and a current location at which the beacon packet is received; and
if it is determined that the calculated spaced distance is equal to or shorter than the limit radius, generate another beacon packet comprising the location and the limit radius.

8. The electronic device of claim 5, wherein the processor is further configured to, if it is determined that the beacon packet comprises emergency or urgent information, process the beacon packet to be played back and generate another beacon packet to the second electronic device.

9. A non-transitory, computer-readable storage medium storing one or more programs that, when executed by a processor, cause the processor to:
receive a beacon packet from a first electronic device via wireless communication links based on Bluetooth low energy (BLE);
identify, from the beacon packet, identification information of a destination electronic device, wherein the identification information is included in a packet data unit (PDU) payload of the beacon packet;
determine whether the identification information of the destination electronic device corresponds to an identifier of an electronic device;
if it is determined that the identification information of the destination electronic device does not correspond to the identifier of the electronic device, generate another beacon packet comprising the identification information; and
broadcast the other beacon packet to relay the beacon packet received from the first electronic device to a second electronic device in accordance with a result of the determination.

10. The method of claim 1, wherein the beacon packet is received via wireless communication based on at least one of a wireless fidelity (Wi-Fi) module, an infrared transmission module, or a speaker.

11. The electronic device of claim 5, wherein the beacon packet is received via wireless communication based on at least one of a wireless fidelity (Wi-Fi) module, an infrared transmission module, or a speaker.

* * * * *